US012799679B2

(12) United States Patent
Kunnari et al.

(10) Patent No.: US 12,799,679 B2
(45) Date of Patent: Nov. 17, 2026

(54) COATING LAYER FOR PAPER AND BOARD USING DISSOLVED CELLULOSE

(71) Applicant: Teknologian tutkimuskeskus VTT Oy, Espoo (FI)

(72) Inventors: Vesa Kunnari, Espoo (FI); Ali Harlin, Espoo (FI); Pauliina Ahokas, Espoo (FI); Hannes Orelma, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 18/859,566

(22) PCT Filed: May 22, 2023

(86) PCT No.: PCT/FI2023/050283
§ 371 (c)(1),
(2) Date: Oct. 24, 2024

(87) PCT Pub. No.: WO2023/222955
PCT Pub. Date: Nov. 23, 2023

(65) Prior Publication Data

US 2025/0283277 A1 Sep. 11, 2025

(30) Foreign Application Priority Data

May 20, 2022 (FI) .................................... 20225448

(51) Int. Cl.

| | |
|---|---|
| ***B29C 41/08*** | (2006.01) |
| ***B05D 1/02*** | (2006.01) |
| ***B29C 71/00*** | (2006.01) |
| ***C08J 5/18*** | (2006.01) |
| ***D21H 19/34*** | (2006.01) |
| ***D21H 21/16*** | (2006.01) |

(Continued)

(52) U.S. Cl.
CPC .............. *D21H 19/34* (2013.01); *B05D 1/02* (2013.01); *B29C 41/08* (2013.01);
(Continued)

(58) Field of Classification Search
CPC ...................................................... B05D 1/02
See application file for complete search history.

(56) References Cited

U.S. PATENT DOCUMENTS 2,296,857 A 9/1942 Lilienfeld
4,623,566 A * 11/1986 Kastl ................. A22C 13/0013 427/407.1

(Continued)

FOREIGN PATENT DOCUMENTS

EP 0336004 A2 10/1989
EP 3231901 A1 10/2017

(Continued)

OTHER PUBLICATIONS

Bialik et al: Design, optimization and modelling of a chemical recovery system for wet spinning of cellulose in sodium carbonate solutions. Cellulose, 2020, vol. 27, pp. 8681-8693.

(Continued)

*Primary Examiner* — Dah-Wei D. Yuan
*Assistant Examiner* — Kristen A Dagenais
(74) *Attorney, Agent, or Firm* — Laine IP Oy

(57) ABSTRACT

According to an example aspect of the present invention, there is provided method for manufacturing a barrier layer on top of a paper or carton board from dissolved cellulose, which combines the benefits of the raw material, improved casting method and replacement of sulphuric acid with sodium carbonate or sodium hydrogen carbonate in regeneration bath.

11 Claims, 3 Drawing Sheets

Figure 1:
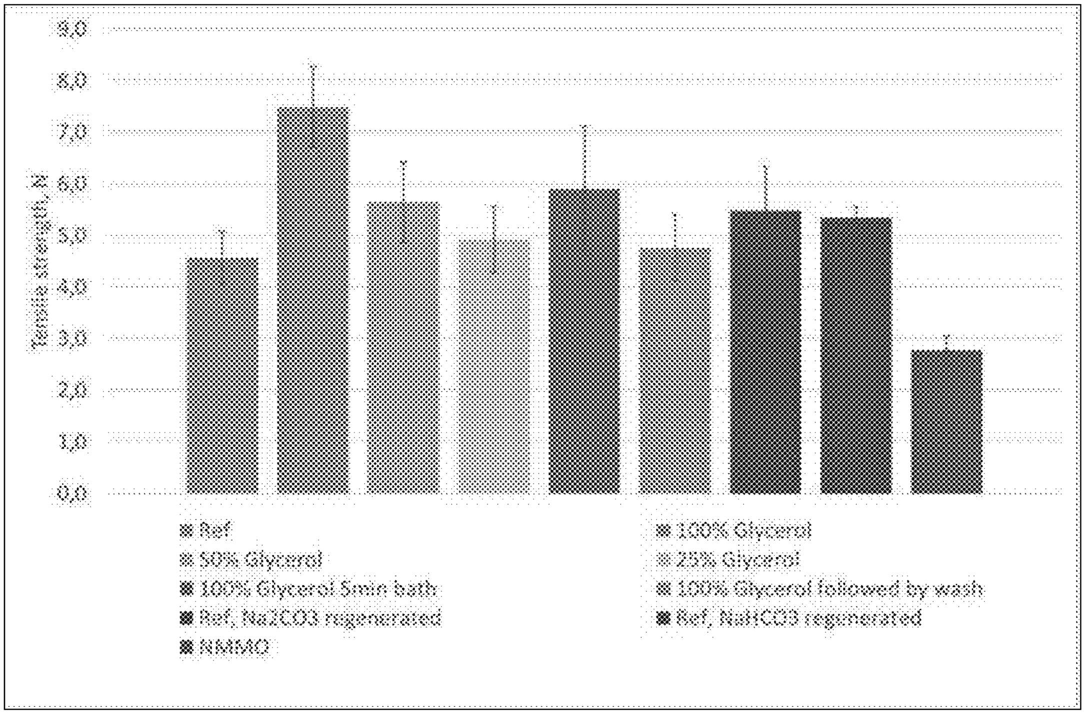

(51) Int. Cl.
*D21H 25/02* (2006.01)
*D21H 25/06* (2006.01)

(52) U.S. Cl.
CPC ............. *B29C 71/0009* (2013.01); *C08J 5/18* (2013.01); *D21H 21/16* (2013.01); *D21H 25/02* (2013.01); *D21H 25/06* (2013.01); *B05D 2203/22* (2013.01); *C08J 2301/02* (2013.01)

(56) References Cited

U.S. PATENT DOCUMENTS

| | | | | |
|---|---|---|---|---|
| 6,406,796 | B1 * | 6/2002 | Ohmura | B41M 5/508 428/328 |
| 2018/0347112 | A1 * | 12/2018 | Löfgren | D21C 5/00 |

FOREIGN PATENT DOCUMENTS

| | | | | | |
|---|---|---|---|---|---|
| EP | 3819426 | A1 | | 5/2021 | |
| WO | WO2009135875 | A1 | | 11/2009 | |
| WO | WO2011078770 | A1 | | 6/2011 | |
| WO | WO-2014207100 | A1 | * | 12/2014 | D21H 27/10 |
| WO | WO2021019468 | A1 | | 2/2021 | |

OTHER PUBLICATIONS

Xie et al: Facile synthesis of fluorine-free cellulosic paper with excellent oil and grease resistance. Cellulose, May 26, 2020, vol. 27, pp. 7009-7022.

Zhu et al: An approach for reinforcement of paper with high strength and barrier properties via coating regenerated cellulose. Carbohydrate Polymers, Jul. 24, 2018, vol. 200, pp. 100-105.

* cited by examiner

COATING LAYER FOR PAPER AND BOARD USING DISSOLVED CELLULOSE

FIELD

The present invention relates to a method for manufacturing a coating layer of dissolved cellulose on top of paper or carton board followed by regeneration, washing, and drying and thereby creating a barrier layer against oxygen, water vapour, loose water and grease. In addition, the present invention provides improved regeneration and film casting methods.

BACKGROUND

Paper and carton boards naturally have poor oxygen, water vapour and grease barrier. If such properties are desired, a coating layer or another web needs to be implemented on top of the paper or board. Typically, barrier coatings have been manufactured from plastics, latex, nanocellulose and such materials. However, these materials have various drawbacks and taking into consideration that plastics industry is going through major changes and developing towards more sustainable plastic-free solutions, new coating innovations are necessary. One promising option is to use dissolved cellulose.

WO 2009/135875 A1 discloses a method for dissolving cellulose, which can then be used for example in manufacturing of fibers, films or granulates. The method comprises steps of a) introducing cellulosic raw material, b) treating the cellulosic raw material in an enzymatic treatment process, c) mixing the cellulosic raw material after the enzymatic treatment in an aqueous solution in order to obtaining an aqueous intermediate product containing the cellulosic raw material of at least 3.5 wt-%, alkali metal hydroxide between 3.5 wt-% and 7 wt-% and zinc salt, d) freezing the intermediate product to a solid state and e) melting the frozen intermediate product.

Dissolving grade pulp is typically regenerated in a coagulation bath containing for example 10 wt-% of sulphuric acid, which possesses problems in process feasibility, work safety and due to acidic nature when used with for example coated paper boards with pigments, which require alkaline process conditions.

Bialik et al. (2020) discloses study design, optimization and modelling of a chemical recovery system for a novel $CS_2$-free viscose-type process that entails dissolution of pre-treated dissolving pulp in a continuous-flow reactor in cold alkali and wet spinning of cellulose in sodium carbonate solutions. However, this article does not disclose methods for manufacturing films or barrier coatings from dissolved cellulose.

In existing technology, dissolving cellulose solutions have been spun into regeneration bath through spinneret when manufacturing yarns. Operating while sunken into sulphuric acid is challenging especially when casting films using a slot die instead of yarns. While operating into acid liquid, observing casting quality and technical operation is difficult. When casting from slot (nozzle) into liquid, there is a counter pressure resisting the dope from exiting the slot, which may effect the pressure distribution along cross-machine direction. In addition, the slot die material requirements are typically high.

There is a thus need for a novel technology for manufacturing coating layers for paper and carton boards by using dissolved cellulose in a safe and feasible manner while simultaneously enabling good control of casting quality.

SUMMARY OF THE INVENTION

The invention is defined by the features of the independent claims. Some specific embodiments are defined in the dependent claims.

According to an aspect of the present invention, there is provided a method for manufacturing a coating layer on top of a paper or carton board from dissolved cellulose.

According to another aspect of the present invention, the coating layer is formed from dissolved cellulose by casting of a dissolved cellulose solution from a nozzle to air and to a support, forming a film, coated paper or coated carton board from the casted dissolved cellulose solution, and leading the formed film, coated paper or coated carton board into a regeneration coagulation bath comprising sodium carbonate or sodium hydrogen carbonate.

These and other aspects, together with the advantages thereof over known solutions are achieved by the present invention, as hereinafter described and claimed.

The method of the present invention is mainly characterized by what is stated in the characterizing part of claim 1.

Considerable advantages are obtained by means of the invention. Dissolved cellulose based dopes provides excellent oxygen, water vapour, loose water and grease barrier for paper or board with one coating layer. Once regenerated, the coating adhesion onto fibre web surface is extremely strong. The casting approach provided herein, i.e. from nozzle to air and to a support, makes it easier to control web variations, such as CD, MD-thickness and impurities. In addition, the slot die used for casting is much easier to operate, design and clean while it is not sunk into the regeneration liquid, which typical casting from nozzle to liquid would cause. Furthermore, the slot material demands are not so high. Replacing typical sulphuric acid coagulation bath to sodium carbonate or sodium hydrogen carbonate provides cost savings for the process, creates safer working environment and allows coating of carbonate pigment (PCC, GCC) coated carton boards, as these typically tend to dissolve in acid conditions. Additionally, approximately 20% enhancement in mechanical properties is achieved, when compared to coagulation baths containing sulphuric acid. It also provides easier recovery of sodium hydroxide.

Next, the present technology is described more closely with reference to certain embodiments.

EMBODIMENTS

The present technology provides a method for coating (for example by slot die or cast coating) a layer, such as a continuous layer of dissolved cellulose on top of paper or carton board followed by regeneration, washing and drying and thereby creating a coating layer, such as a barrier layer against oxygen, water vapour, loose water and grease. Regeneration is preferably carried out in a coagulation bath, where the dissolved cellulose dopes enter into sodium carbonate or sodium hydrogen carbonate solutions. The casting quality and control is improved by casting of the dissolved cellulose from nozzle to air and to support (such as for example paper or carton board) instead of nozzle to liquid.

FIG. 1 is a chart disclosing the tensile strength (N) of the standalone films in sodium carbonate or sodium hydrogen carbonate solutions. The results show that using glycerol results in higher tensile strength, 70 second bath residence time or even lower is enough for the desired effect, when washed after glycerol bath tensile appears unaffected, and that $Na_2CO_3$ and $NaHCO_3$ regenerated samples have higher tensile strength compared to $H_2SO_4$ regenerated samples. Washing after glycerol bath should follow dipping into 100% glycerol bath. In trials more beneficial was to use 10%/90% glycerol/water bath without washing.

Figure 2:
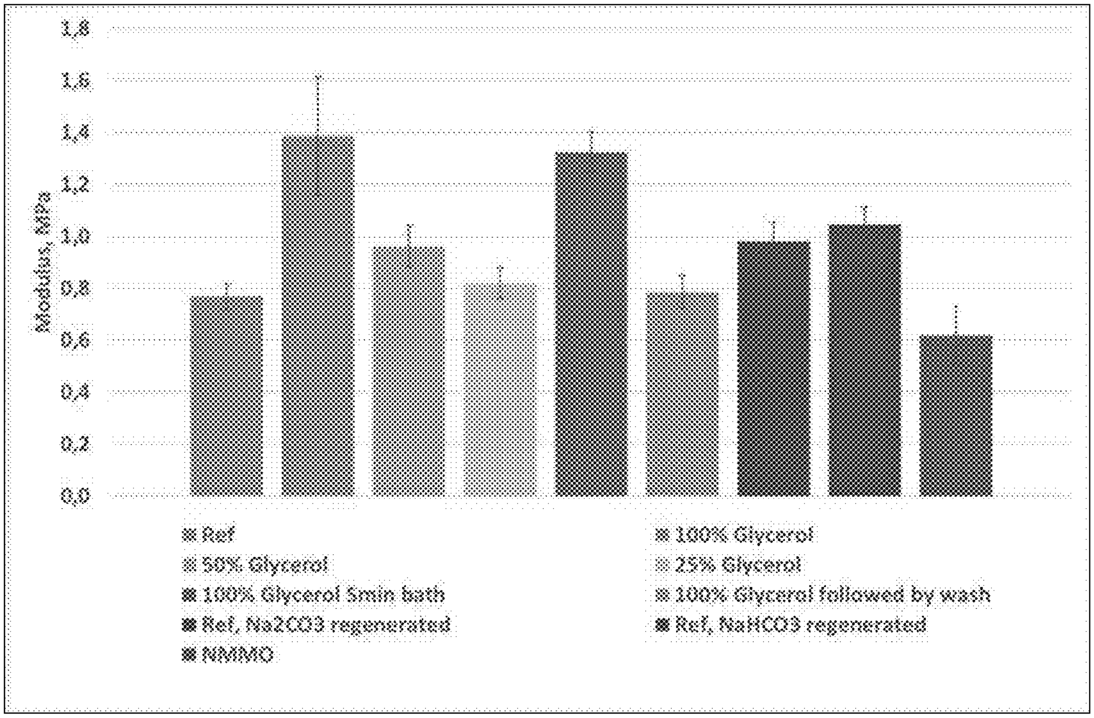

FIG. 2 is a chart disclosing the modulus (MPa) of the standalone films in sodium carbonate or sodium hydrogen carbonate solutions. The results show that using glycerol results in higher modulus, 70 seconds bath time or even lower is enough for the desired effect, when washed after glycerol bath modulus appears unaffected, and that $Na_2CO_3$ and $NaHCO_3$ regenerated samples have higher modulus compared to $H_2SO_4$ regenerated samples.

Figure 3:
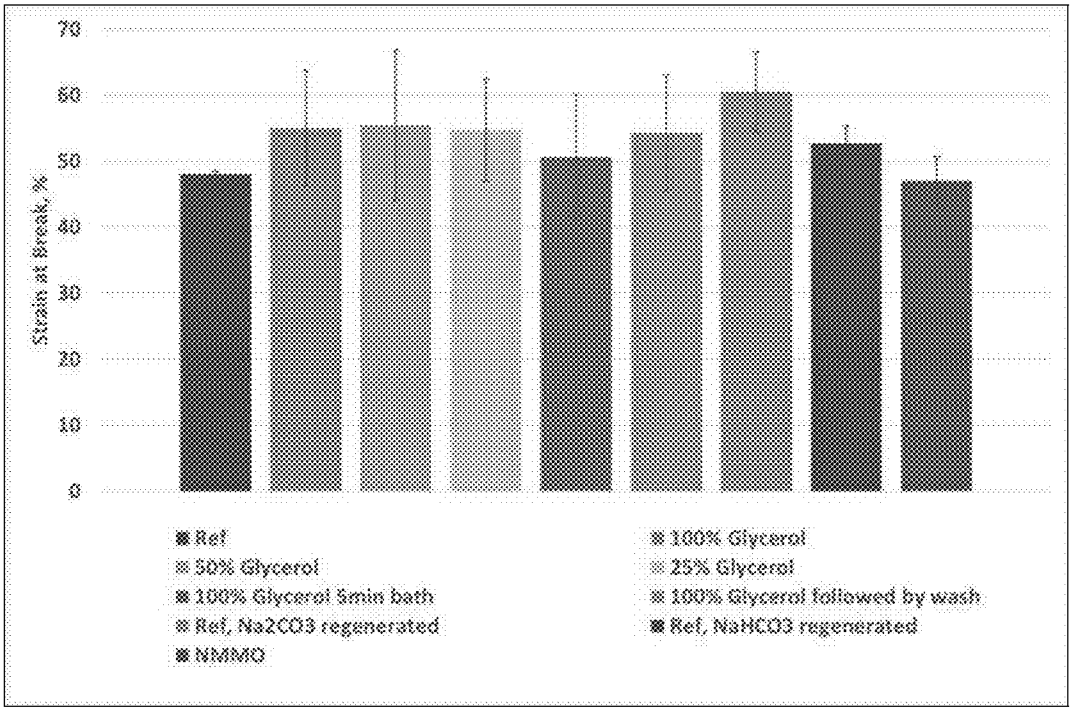

FIG. 3 is a chart disclosing the strain at break (%) of the standalone films in sodium carbonate or sodium hydrogen carbonate solutions. The results show that glycerol increases strain at break, and that overall values are high.

Figure 4:
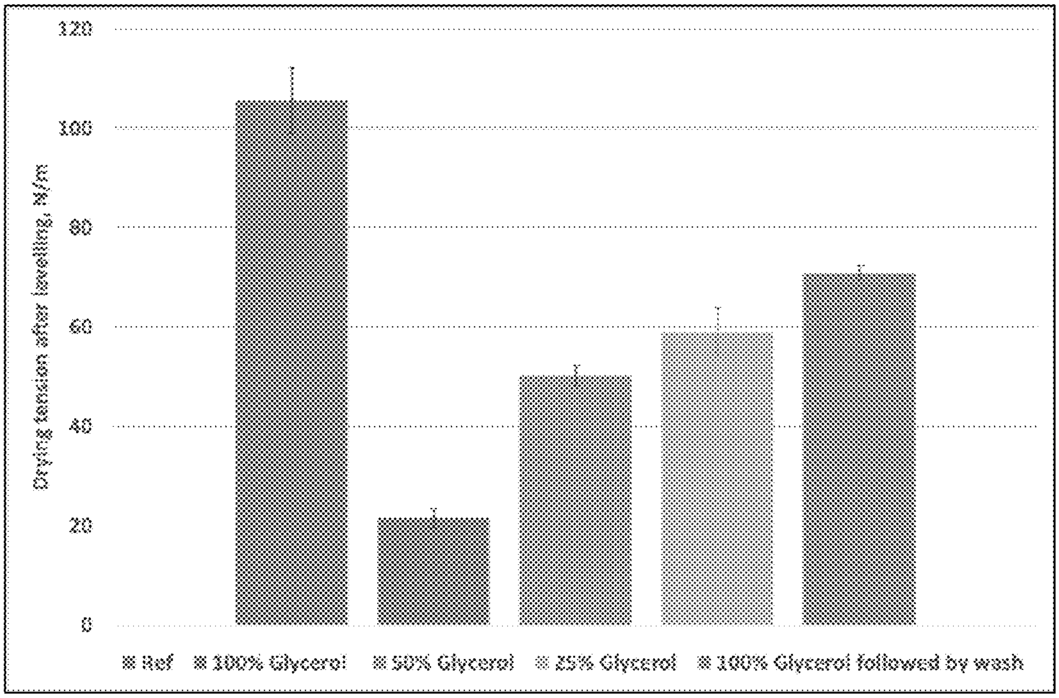

FIG. 4 is a chart disclosing the drying tension after levelling (N/m) of the standalone films. The results show that glycerol decreases drying tension significantly, and the effect of glycerol after washing is seen clearly. Also hard feel (i.e. softer grip) supports the observation that wash bath after glycerol bath does not remove all glycerol.

Figure 5:
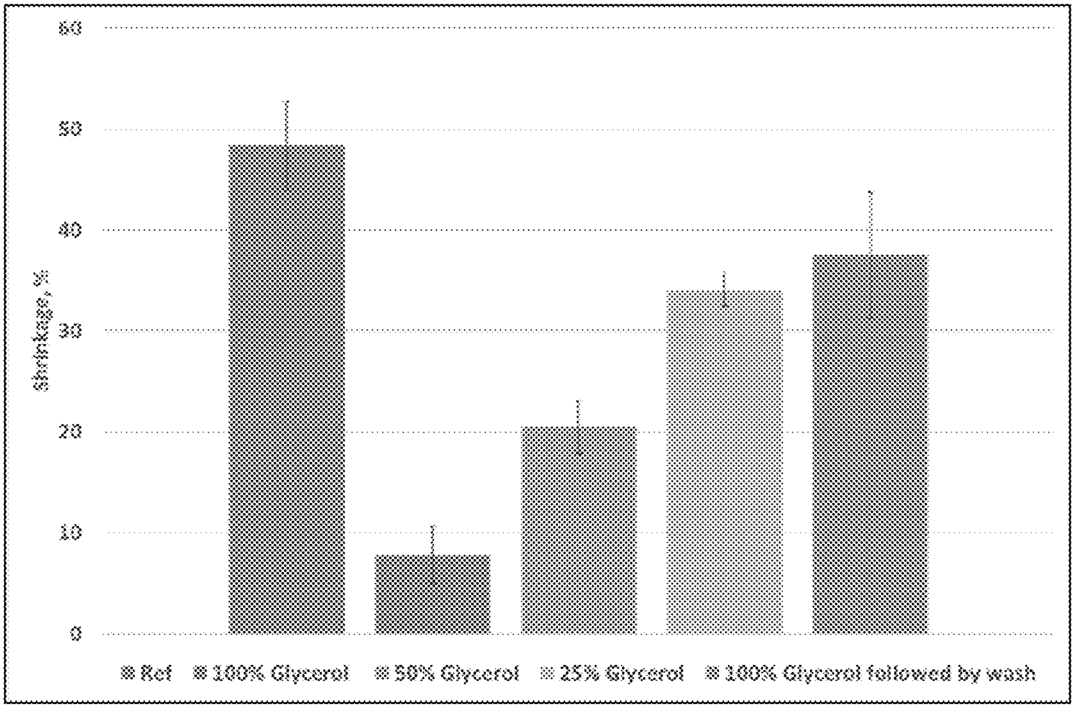

FIG. 5 is a chart disclosing the shrinkage vs. modulus (%) of the standalone films. The results show that glycerol decreases shrinkage significantly, and the effect of glycerol after washing is seen clearly. Values are measured in CD-direction of 24 mm wide strips.

Figure 6:
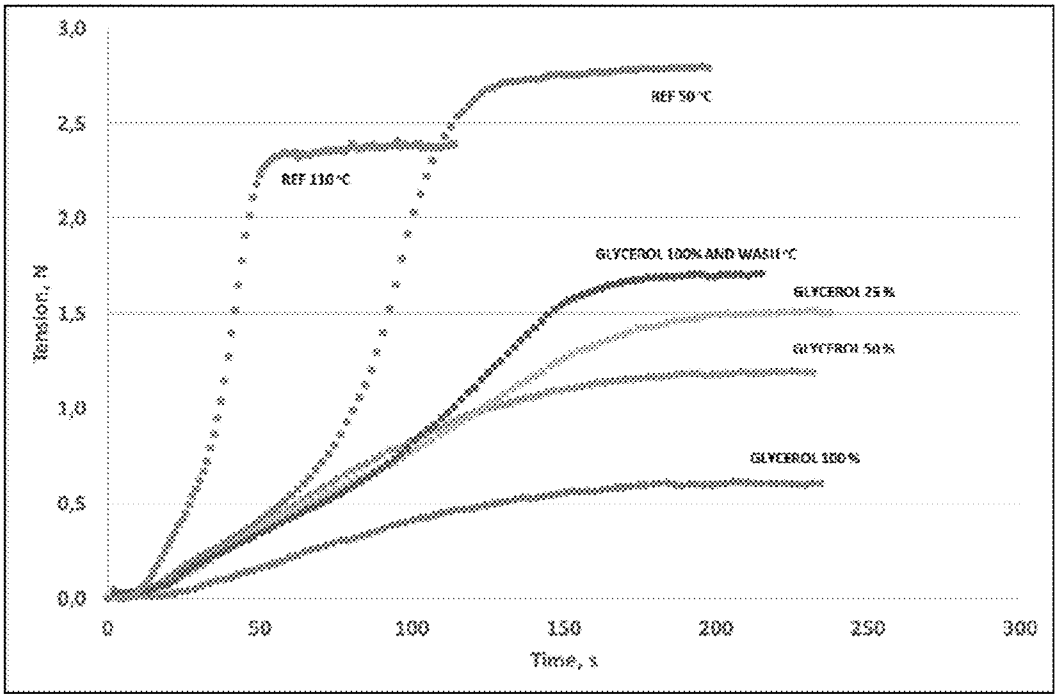

FIG. 6 is a chart disclosing the drying tension (N) of the standalone films. The results show that drying is fast, at best only 60 seconds. Glycerol slows down the time required for tension to level off. Tension curves differ and the effect of glycerol consistency is seen clearly. In addition, steepness of the curves is different and when water is more than 50% in glycerol, there is a drop of tension curve raising stage.

The present technology is based on specific combination of three main aspects: 1) coating a layer of dissolved cellulose on top of paper or carton board, followed by regeneration, washing and drying 2) wherein the regeneration is preferably carried out in a coagulation bath comprising sodium carbonate or sodium hydrogen carbonate solutions, and 3) casting from nozzle to air and to support.

One embodiment is a method for manufacturing a coating layer on top of a paper or carton board from a dissolved cellulose material, comprising at least the steps of:

- preparing a dissolved cellulose solution,
- casting the dissolved cellulose solution from a nozzle to air and to a support,
- forming a film, coated paper or coated carton board from the casted dissolved cellulose solution,
- leading the formed film, coated paper or coated carton board into a regeneration coagulation bath comprising sodium carbonate or sodium hydrogen carbonate, and
- washing and drying of the film, coated paper or coated carton board.

The dissolved cellulose solution may be prepared for example by the method disclosed in WO 2009/135875 A1.

According to one embodiment, the described method is used for manufacturing a barrier layer.

According to one embodiment, the dissolved cellulose material is selected from dissolving pulp, bleached hard wood pulp, bleached softwood pulp and recycled fibres demonstrating impact of hemicellulose and inorganic impurities.

According to one embodiment, the casting is carried out in ambient air.

According to one embodiment, the casting is carried out onto a metallic support, such as onto a metallic flat belt or roller surface. Casting onto metallic support (belt of roller) enables better control of casting quality and makes it essentially easier to solve blocking issues, start-ups and cleaning procedures. CD- and MD-profile thickness measurements are possible right after casting, which enhances the quality of the end-product. In addition, the casting unit material may be less acid durable. Furthermore, work safety is improved as lifting and lowering of slot die into acid regeneration bath is not needed. This embodiment is useful for example when preparing stand alone films.

In one embodiment, there is an air gap between the nozzle and the support, such as below one millimetre. Casting from slot using a sub one millimetre gap through air into preferred metallic type belt or roller without the need to cast directly into regeneration liquid has the advantages discussed above.

In one embodiment, regeneration coagulation bath comprises 20 to 30 wt-% of $Na_2CO_3$ or $NaHCO_3$ and 1 to 10 wt-% of NaOH.

In one embodiment, the regeneration and coagulation is carried out at a temperature of about 30° C. when using sodium carbonate and at a temperature of about 40° C. when using sodium hydrogen carbonate.

Preferably, instead of typical 10% sulphuric acid, coagulation of standalone films or dissolved cellulose coated paper or carton board is coagulated in approximately 24 wt-% $Na_2CO_3$ and 4 wt-% NaOH at 30° C. or in 24 wt-% $NaHCO_3$ and 4 wt-% NaOH at 40° C.

According to one embodiment, the coating layer, such as a barrier coating layer, of dissolved cellulose is manufactured on top of at least one surface of the paper or carton board, wherein the surface is preferably fibrous and in a form of a web. Thus, at least one surface of the paper or carton board is coated, which means that the coating layer can exist either on one outer surface, both outer surfaces or even in between different surface layers. In the latter embodiment, the coating layer can perform as a gluing layer for multi-layered fibrous structures. Such coating layer manufactured by the herein disclosed method on top of at least one surface of a paper or carton board belongs to the scope of the present invention.

According to one embodiment, it is preferred to use a plasticizer generally suitable for different cellulose materials, such as glycerol.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

The present technology provides coatings, such as oxygen, water vapour and grease barrier coatings for paper and carton boards used in various end-products, which coatings are manufactured from dissolved cellulose with unique unit operations. The starting material complies with the current EU-plastic related regulations and is not qualified as a plastic.

EXAMPLES

Example 1

A stand alone film was manufactured in lab scale from regenerated cellulose solution (Biocelsol dissolving method) having solids content of 6.44% and ball drop viscosity (ball dropping time for 200 mm; $D_{pipe}=D_{ball}=1/8$", 130 mg; modified ASTM D1343-95) at 20° C. 66 seconds was casted on 1.5 mm thick stainless steel ANSI 304 plate using an Ericsson lab coater with a comb having a 400 micron casting gap in room temperature. After casting the stainless steel plate was sunk into 10% sulphuric acid bath in room temperature for two minutes to regenerate the casted solution. After 90 seconds the casted cellulose solution began to detach from steel plate surface and after 120 seconds it was carefully transferred to water bath with running water for ten minutes. After ten minutes the sheet was removed from water bath and placed to milliq water bath in room temperature. Next day the wet sheet was placed on glass plate on cut to 15 mm wide strips and again placed into milliq water bath. Prior to tensile measurements each strip was placed into 5% glycerol/water mixture for 70 seconds and measured immediately using Lloyd tensile tester with 100N force cage to evaluate wet tensile properties and effect of plasticizer.

Example 2

A stand alone film having final thickness of 30 microns was manufactured in lab scale. A regenerated cellulose solution (Biocelsol dissolving method) having solids content of 6.44% and ball drop viscosity (ball dropping time for 200 mm; $D_{pipe}=D_{ball}=1/8$", 130 mg; modified ASTM D1343-95) at 20° C. 66 seconds was casted on 1.5 mm thick stainless steel ANSI 304 plate using an Ericsson lab coater with a comb having a 400 micron casting gap in room temperature. After casting the stainless steel plate was sunk into 24% sodium hydrogen carbonate dissolved in 4% NaOH water solution bath heated to 40° C. temperature for two minutes to regenerate the casted solution. After 110 seconds the casted cellulose solution began to detach from steel plate surface and after 120 seconds it was carefully transferred to water bath with running water for ten minutes. After ten minutes the sheet was removed from water bath and placed to milliq water bath in room temperature. Next day the wet sheet was placed on glass plate on cut to 15 mm wide strips and again placed into milliq water bath. Prior to tensile measurements each strip was placed into 5% glycerol/water mixture for 70 seconds and measured immediately using Lloyd tensile tester with 100N force cage to evaluate wet tensile properties and effect of plasticizer.

Example 3

A stand alone film having final thickness of 28 microns was manufactured in lab scale. A regenerated cellulose solution (Biocelsol dissolving method) having solids content of 6.44% a regenerated cellulose solution (Biocelsol dissolving method) having ball drop viscosity (ball dropping time for 200 mm; $D_{pipe}=D_{ball}=1/8$", 130 mg; modified ASTM D1343-95) at 20° C. 66 seconds was casted on 1.5 mm thick stainless steel ANSI 304 plate using an Ericsson lab coater with a comb having a 400 micron casting gap in room temperature. After casting the stainless steel plate was sunk into 24% sodium hydrogen carbonate dissolved in 4% NaOH water solution bath heated to 40° C. temperature for two minutes to regenerate the casted solution. After 110 seconds the casted cellulose solution began to detach from steel plate surface and after 120 seconds it was carefully transferred to water bath with running water for ten minutes. After ten minutes the sheet was removed from water bath and placed to milliq water bath in room temperature. Next day the wet sheet was placed into 5% glycerol/water mixture for 70 seconds and after placed on specially designed drying apparatus. The sheet was attached using magnets from all sides to steel frame open from bottom and top side allowing the water to evaporate freely and preventing shrinkage during drying. The sheet was let to dry in lab conditions (23° C., 50% RH) for 24 hours prior to cutting to 15 mm wide strips and measured using Lloyd tensile tester with 100N force cage.

Example 4

Regenerated cellulose solution (Biocelsol dissolving method) having solids content of 6.7% was casted on carton board containing an unbleached and pigmented outer layers with total grammage of 185 g/m$^2$. Using an Ericsson lab coater combs having a 200 and 400 micron casting gap carton board sheets were coated in room temperature onto pigmented side. After casting, carton boards sheets were placed into 24% sodium hydrogen carbonate dissolved in 4% NaOH water solution bath heated to 40° C. for two minutes to regenerate and attach the casted solution to carton board surface. After 120 seconds board sheets were transferred to water bath with running water for ten minutes. After ten minutes the sheets were removed from water bath and placed between blotting papers in a table top lab scale dryer and drying in approximately 80° C. degrees heat until dry. After 200 micron and 400 micron wet layer coated sheets were conditioned in standard lab conditions for 48 hours and oxygen barrier of sheets was measured. Oxygen barrier for thinner coating was 11.9±1.4 cc/(m$^2$×day) and for thicker coating layer 3.5±1.1 cc/(m$^2$×day) which correspond to dry coating layer of approximately 12 to 16 microns and 26 to 30 microns.

CITATION LIST

Patent literature

WO 2009/135875 A1

Non-patent literature:

Bialik M., Jensen A., Kotilainen O., Kulander I., Lopes M., Design, optimization and modelling of a chemical recovery system for wet spinning of cellulose in sodium carbonate solutions, Cellulose 27, 8681-8693, 2020.

The invention claimed is:

1. A method for manufacturing a coating layer on top of a paper or carton board from a dissolved cellulose material, wherein the method comprises at least the steps of:

preparing a dissolved cellulose solution, casting the dissolved cellulose solution from a nozzle to air and to a support, forming a film, coated paper or coated carton board from the casted dissolved cellulose solution, leading the formed film, coated paper or coated carton board into a regeneration coagulation bath comprising sodium carbonate or sodium hydrogen carbonate, and washing and drying of the film, coated paper or coated carton board.

2. The method according to claim 1, wherein the dissolved cellulose material is selected from dissolving pulp, bleached hard wood pulp, bleached softwood pulp and recycled fibres.

3. The method according to claim 1, wherein the casting is carried out in ambient air.

4. The method according to claim 1, wherein the casting is carried out onto a metallic support, when preparing a stand-alone film.

5. The method according to claim 1, wherein there is an air gap between the nozzle and the support.

6. The method according to claim 1, wherein the regeneration coagulation bath comprises 20 to 30 wt-% of $Na_2CO_3$ or $NaHCO_3$ and 1 to 10 wt-% of NaOH.

7. The method according to claim 1, wherein the regeneration and coagulation is carried out at a temperature of about 30° C. when using sodium carbonate and at a temperature of about 40° C. when using sodium hydrogen carbonate.

8. The method according to claim 1, wherein the regeneration and coagulation is carried out in a bath comprising 24 wt-% $Na_2CO_3$ and 4 wt-% NaOH at temperature of 30° C., or 24 wt-% $NaHCO_3$ and 4 wt-% NaOH at temperature of 40° C.

9. The method according to claim 1, wherein the coating layer of dissolved cellulose is manufactured on top of at least one surface of the paper or carton board, wherein the at least one surface is fibrous and in a form of a web.

10. The method according to claim 1, wherein the process manufactures a continuous coating layer.

11. The method according to claim 1, further comprising placing the formed film, coated paper or coated carton board into a glycerol bath.

* * * * *